P. D. BURGHER.
Saw Sharpening Machine.
No. 163,974.
Patented June 1, 1875.
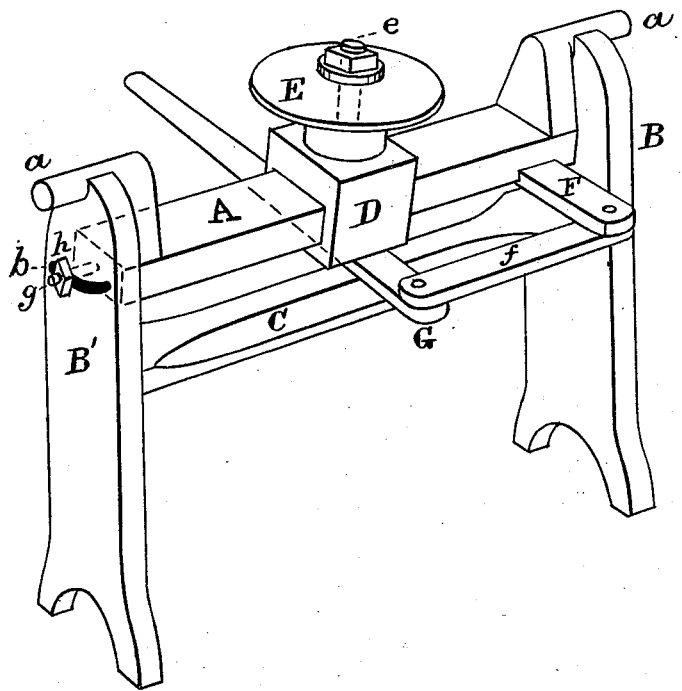
Witnesses:
H. A. Daniels
James Fergusson
Inventor:
Peter D. Burgher,
by H. W. J. Howard,
Attorneys.

UNITED STATES PATENT OFFICE.

PETER D. BURGHER, OF DEEP CREEK, VIRGINIA.

IMPROVEMENT IN SAW-SHARPENING MACHINES.

Specification forming part of Letters Patent No. 163,974, dated June 1, 1875; application filed April 7, 1875.

*To all whom it may concern:*

Be it known that I, PETER D. BURGHER, of Deep Creek, in the county of Norfolk and State of Virginia, have invented certain Improvements in Machines for Sharpening Circular Saws, of which the following is a specification, reference being had to the accompanying drawing forming a part hereof.

My present invention relates to improvements upon a machine for the above-named purpose for which an application for Letters Patent filed by me is now pending.

In that invention, the Letters Patent for which will bear even date herewith, and to which I refer for a better understanding hereof, the sharpening is accomplished by the saw being brought into contact with a revolving grinding-disk or emery-wheel, the construction and application of the traveling rest for the saw admitting of the movement of the saw during the grinding operation to the various positions found necessary to give the required superficial outline to the teeth, and the desired angle to their cutting-edges. The particular use to which the present invention is applied is the grinding of the teeth of large crosscut-saws, such as are employed for cutting shingle and heading bolts before they are cut into shingles or heading. For this purpose the teeth must be made very much beveled, or knife-like, else they will not cut rapidly. Ordinarily this beveling of the teeth has been accomplished by means of a file for the want of a machine in which the requisite angle of saw-rest could be given.

In the machine constituting my other invention, hereinbefore alluded to, this result is largely accomplished, but in a manner requiring more adjustment of parts, and consequently greater labor, than is necessary in the machine forming my present invention. Substantially the grinding devices described in my said prior invention, and their mode of attachment and co-operation with the said moving mechanism, are retained in the use of my present improvement.

The accompanying drawing, forming a part of this specification, represents a perspective view of my invention.

A is the saw-swing, resting and vibrating in the standards B B' upon pins *a*. C is a connecting or strengthening piece between the standards B B'. The central or lower portion of the saw-swing forms a slide, upon which the traveler D is moved, the traveler supporting the boss E, upon which the saw rests. A bolt, *e*, projects from the traveler, passing through the boss E and the saw, and is provided with a thread and nut, by means of which the saw is secured. Extending from the slide of the traveler D is a bearing, F, to which is pivoted a link, *f*, connecting with the short end of a lever, G, which has its fulcrum at the under side of the traveler. By means of the lever G the traveler and the saw supported upon the boss E are given a reciprocating movement, as may be necessary to bring the saw in or remove it from contact with the grinding device. The standard B' is provided with a slot, *b*, in the form of an arc of a circle, which, in connection with the bolt *g*, extending from the end of the saw-swing, and passing through the slot and the nut *h*, serves to cause the saw-swing to be locked at any angle of inclination within the limit of the arc. The necessary angle to which the saw must be brought in giving to its teeth the requisite bevel of face is thus procured, the saw at the same time being brought so low, or so near the center of motion, that when tilted it is not thrown either way beyond the center line of the emery-wheel. This invention operates equally well when adapted to the grinding of square-faced teeth, as the saw can, as is readily seen, be secured horizontally.

I claim as my invention, and wish to secure by Letters Patent of the United States—

The saw-swing A, resting in, and adapted to be secured horizontally or at an angle in, its frame, in combination with the traveler D, saw-rest E, bearing F, link *f*, and lever G, all combined and operating substantially as and for the purposes specified.

In testimony whereof I have hereto subscribed my name.

PETER D. BURGHER.

Witnesses:
J. L. ROPER,
L. J. ROPER.